United States Patent [19]
Ohkubo et al.

[11] Patent Number: 5,382,301
[45] Date of Patent: Jan. 17, 1995

[54] HIGH PERMEABILITY THIN-FILM MAGNETIC HEAD AND METHOD OF MANUFACTURE

[75] Inventors: Keiji Ohkubo, Yokosuka; Yuko Arimoto, Yokohama; Hiroyuki Uwazumi, Matsumoto; Hisashi Yamasaki, Yokohama, all of Japan

[73] Assignee: Fuji Electric Co., Ltd., Japan

[21] Appl. No.: 961,395

[22] Filed: Oct. 15, 1992

[30] Foreign Application Priority Data

Oct. 18, 1991 [JP] Japan ................. 3-271257

[51] Int. Cl.6 .................. G11B 5/31; H01F 41/22
[52] U.S. Cl. .................... 148/108; 29/603; 427/130
[58] Field of Search ............ 148/108; 427/131, 130; 29/603

[56] References Cited

U.S. PATENT DOCUMENTS 4,544,421 10/1985 Springer ............... 148/103
5,214,840 6/1993 Imagawa et al. ....... 29/603

FOREIGN PATENT DOCUMENTS 59-35431 8/1984 Japan .
60-95716 5/1985 Japan .
3-130910 6/1991 Japan .
3-136216 11/1991 Japan .

Primary Examiner—George Wyszomierski
Attorney, Agent, or Firm—Parkhurst, Wendel & Rossi

[57] ABSTRACT

A thin-film magnetic head is disclosed that includes a lower magnetic core and an upper magnet core formed on the surface of a substrate and connected together at a first end thereof, a magnetic gap is formed between the lower and upper magnetic cores at a second end thereof, and a coil-form electric conductive layer is located between the lower magnetic core and the upper magnet core. The lower and upper magnetic cores have a saturated magnetic flux density from 10,000 G to 18,000 G, while the magnetic permeability along the magnetic path of the magnetic head is 3,000 or higher at a frequency of 10 MHz. The unique characteristics of the magnetic head are obtained by heating an arrangement comprising the lower and upper magnetic cores, the magnetic gap layer, and the electric conductive layer to a temperature above 325° C., and applying an external magnetic field greater than 0.01 kOe to the lower and upper magnetic cores to relax their magnetic anisotropy as the lower and upper magnetic cores are cooled during the manufacturing process.

5 Claims, 3 Drawing Sheets

HIGH PERMEABILITY THIN-FILM MAGNETIC HEAD AND METHOD OF MANUFACTURE

FIELD OF THE INVENTION

The present invention relates to a thin-film magnetic head and a method of manufacturing thereof, and more particularly to technology to improve the magnetic permeability of the magnetic cores of thin-film magnetic heads.

BACKGROUND OF THE INVENTION

In order to realize an increased recording density in magnetic recording devices, magnetic recording media utilized in the devices have tended toward increased track density resulting from narrower tracks. Moreover, the line density of the magnetic recording media has also tended to increase as a result of the use of higher frequency recording in recent years. For this reason, different kinds of thin-film magnetic heads with steep head magnetic field distribution have been proposed to cope with the higher density recording in the magnetic recording media and, at present, such magnetic heads are being employed.

For example, a thin-film magnetic head of the magnetism induction type has, as shown in FIG. 1, a lower magnetic core 3 and a magnetic gap-forming layer 4 on the substrate 2, a lower insulation layer 5 and an upper insulation layer 6 formed on the magnetic gap-forming layer 4, coil-formed electric conductive layers 7, the cross-section of which is expressed as it is formed between the magnetic gap-forming layer 4 and the lower insulation layer 5, and between the lower insulation layer 5 and the upper insulation layer 6, an upper magnetic core 8 formed on the magnetic gap-forming layer 4 and the upper insulation layer 6, and the protection layer 9.

The recording and playback characteristics of the thin-film magnetic head 1 are governed largely by the magnetic characteristics of the lower and upper magnetic cores 3, 8. For example, to enable the head 1 to be used in high frequency regions ($\approx 10$ MHz), the magnetic permeability of the lower and upper magnetic cores 3, 8 must be large in high frequency regions. Accordingly, uniaxial anisotropy is used so that the track width in the thin-film magnetic head 1 becomes an easily magnetized axis, whereas a magnetizing process using a magnetizing rotation can be utilized when a magnetic field is applied perpendicularly to the track width during recording or playback. A permalloy NiFe alloy with a saturated magnetic flux density from 7,000 G to 8,000 G has been used conventionally for this type of magnetic core.

Furthermore, in magnetic recording field, it has been a growing trend to utilize media having a greater coercive force to raise the recording density, for which, because the saturated magnetic flux density of the conventional permalloy NiFe alloy is too low, Co-based amorphous alloys have been adopted rather than the former material. In the case of these Co-based amorphous alloys, the saturated magnetic flux density is about 12,000 G, which is sufficiently high to correspond to the coercive force of the magnetic recording media.

However, since magnetic core materials having high saturated magnetic flux density, such as a Co-based amorphous alloy, have an inherently strong uniaxial anisotropy, the anisotropic magnetic field, Hk, of such materials is so large that it causes the several problems, namely, because it is necessary to increase the operating frequency for the thin-film magnetic head 1 to achieve a higher frequency recording, the lower and upper magnetic cores 3, 8 must have a high magnetic permeability $\mu$ at their operating frequency. The magnetic permeability $\mu$ is expressed by the following equation, where a magnetic core material, which has a large anisotropic magnetic field, Hk, has its magnetic permeability $\mu$ reduced:

$$\mu = Bs/Hk$$

where Bs is a saturated magnetic flux density.

Therefore, a method has been used conventionally to relax the magnetic anisotropy and reduce the anisotropic magnetic field Hk by heat treating the lower and upper magnetic cores 3, 8 and providing a rotating magnetic field application treatment under an atmosphere at a certain temperature, as disclosed in the Japanese Publication of examined patent application S59-35431.

However, the method of simply applying a magnetic field in an atmosphere at a certain temperature, as in this conventional anisotropy relaxing temperature, has such a small effect that, when the above magnetic materials are used, the magnetic permeability of the lower and upper magnetic cores 3, 8 reaches only about 2,500, causing a problem in that the magnetic head 1 cannot follow the higher frequency signals recorded on the magnetic recording media.

Furthermore, conventional methods of relaxing the magnetic anisotropy require a very bulky and expensive magnetic field application device. For example, the typical conventional production process for the thin-film magnetic head 1 builds several hundred elements collectively on one substrate via a photolithography technique, and cuts the substrate to produce individual thin-film magnetic heads 1. Therefore, many substrates having a diameter of 3 to 4 inches are heat treated while being subjected to a uniform magnetic field collectively. Hence the process requires a large heating furnace. Therefore, in order to apply a uniform magnetic field of about 1 kOe to each part of each substrate externally from the heating furnace, the magnetic field generator employed is a bulky and expensive piece of equipment, which causes problems during actual operations.

Given these problems, it is an object of the present invention to provide thin-film magnetic heads capable of high magnetic permeability. It is a further object of the invention to provide a method of manufacturing the heads that makes it possible to use a small and practical magnetic field generator by optimizing the conditions of applying an external magnetic field during magnetic anisotropy relaxing treatment.

SUMMARY OF THE INVENTION

The present invention provides a magnetic head in which a lower magnetic core and an upper magnetic core formed on the surface of a substrate are connected together at a first end, the periphery of the connection being wound around by an electrically conductive body, and a magnetic gap being formed between the magnetic cores at a second end thereof, where the lower and upper magnetic cores have their saturated magnetic flux density from 10,000 G to 18,000 G, while the magnetic permeability along the magnetic path of the magnetic head is 3,000 or higher at a frequency of 10 MHz. In this construction, the lower and upper magnetic cores may be made of Co-based amorphous alloys which have been subjected to an anisotropic relaxation treatment, such as an CoZrTa-based amorphous alloy, CoHfTa-based amorphous alloy or CoHfPd-based amorphous alloy.

The method of manufacturing a thin-film magnetic head of this construction includes the application of a heat treatment process, wherein the lower and upper magnetic cores formed on the surface of a substrate are heated, and the lower and upper magnetic cores are subjected, at least during the cooling process, to an external magnetic field of more than 0.01 kOe to relax their magnetic anisotropy. In other words, an external magnetic field is not simply applied to the lower and upper magnetic cores maintained at an elevated temperature, but is applied to the lower and upper magnetic cores while their temperature is being reduced.

A static magnetic field that has a magnetic field of a head magnetic field path component may be utilized as the external magnetic field in addition to a rotation magnetic field applied to the lower and upper magnetic cores. In this case, the lower and upper magnetic cores may be made of Co-based amorphous alloy.

Preferably, in order to effect the improvement in magnetic permeability, the external magnetic field is applied during the cooling process at least until the temperature in said lower and upper magnetic cores drops below 250° C.

It is also preferable for the cooling process to be carried out after the lower and upper magnetic cores reach a temperature ranging between 325° C. and their crystallization temperatures. It is also desirable, during the heat treatment, for the lower and upper magnetic cores to be kept at an elevated temperature for longer than ten minutes.

In the present invention, when the lower and upper magnetic cores are subjected, during at least the cooling process, to an external magnetic field of more than 0.01 kOe to relax their magnetic anisotropy, that is a rotation magnetic field, for example, as a heat treatment process (magnetic anisotropy relaxing treatment), the uniaxially anisotropic magnetic material can have its magnetic anisotropy more effectively relaxed notwithstanding that it is a small external magnetic field. As a result, the anisotropic magnetic field Hk can be reduced more effectively. This allows an increase in magnetic permeability expressed by Bs/Hk (Bs is a saturated magnetic flux density), and the magnetic permeability in the high frequency region (operating region) in particular, making it possible for the thinfilm magnetic head to sufficiently cope with the higher line density and higher frequency recording utilized in magnetic recording media.

The discovery that an anisotropic magnetic field could be effectively relaxed by applying a magnetic field to a magnetic material being cooled became known as a result of reiterated experiments, although the reason for this has not been determined in detail. It is assumed, however, that such a phenomenon occurs because an easily magnetizable axis is rotated partially in the direction of the axis, which is difficult to magnetize when the temperature of the lower and upper magnetic cores is decreased and becomes irreversible to a certain degree.

BRIEF DESCRIPTION OF THE DRAWINGS

With the above as background, reference should now be made to the following detailed description of the preferred embodiment of the invention and the accompanying drawings, wherein.

DETAILED DESCRIPTION OF THE PREFERRED EMBODIMENTS

Figure 1:
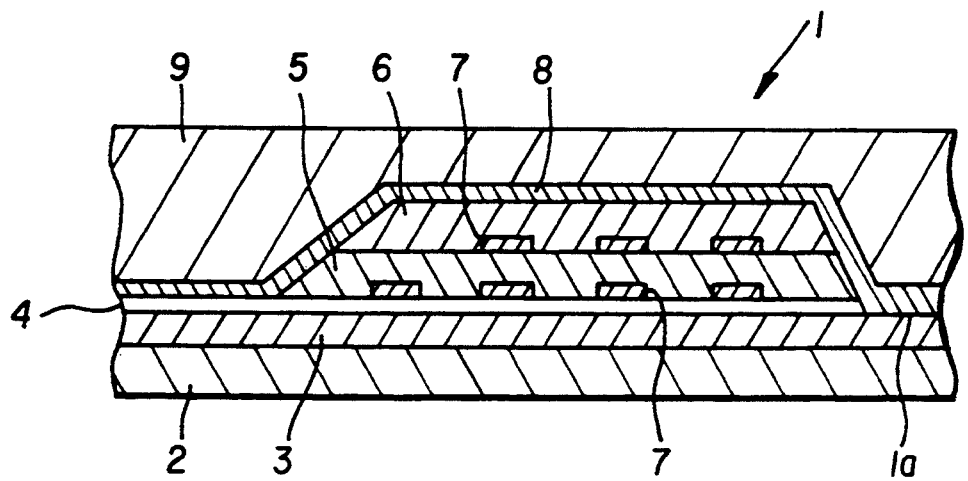
FIG. 1 is a cross section of a thin-film magnetic head in accordance with the present invention.

FIG. 1 is a summarized cross section of a thin-film magnetic head of a magnetism induction type according to one embodiment of the present invention. In this figure, the construction of the thin-film magnetic head is similar to that of the conventional thin-film magnetic head, which was therefore also explained in the background section above utilizing FIG. 1.

As shown in FIG. 1, the following elements are laminated on the substrate 2 of the thin-film magnetic head 1: a lower magnetic core 3 made of Co-based amorphous alloy, a magnetic gap-forming layer 4 made of aluminum oxides, a lower insulation layer 5 and the upper insulation layer 6 formed on the magnetic gap-forming layer 4, coil-form electric conductive layers 7, the cross-section of which are shown as it is formed between the magnetic gap-forming layer 4 and the lower insulation layer 5, and between the lower insulation layer 5 and the upper insulation layer 6, an upper magnetic core 8, made of Co-based amorphous alloy, formed on the magnetic gap-forming layer 4 and the upper insulation layer 6, and a protective layer 9. In this construction, the lower magnetic core 3 and the upper magnetic core 8 are connected together at one end, while at the other end the magnetic gap-forming layer 4 is interposed between these layers. The coil-form electric conductive layer 7 winds around the connection 1a of the lower magnetic core 3 and the upper magnetic core 8 more than two times.

In the thin-film magnetic head 1 so constructed, the lower magnetic core 3 and the upper magnetic core 8 are magnetized by flowing a recording current into the coil-form electric conductive layer 7 to record information items on a magnetic recording media utilizing the magnetic field leaking from the magnetic gap-forming layer 4. To play back the information from the magnetic recording media, the magnetic field from the magnetic recording media that passes through the lower and upper magnetic cores 3, 8 via the coil-form electric conductive layer 7 is converted into a voltage signal, which can be detected. In the thin-film magnetic head 1 of this embodiment, because both the lower magnetic core 3 or the upper magnetic core 8 are made of Co-based amorphous alloy, the saturated magnetic flux density becomes as high as between 10,000 G and 18,000 G. Therefore, the cores can readily withstand the coercive force of the magnetic recording media even if this force increases to raise the recording density in the magnetic recording media. Furthermore, because the lower magnetic core 3 and the upper magnetic core 8 have a reduced anisotropic magnetic field Hk as a result of the application of a relaxing treatment to the magnetic anisotropy as will be described below, the magnetic permeability $\mu$ expressed as Bs/Hk (Bs is the saturated magnetic flux density) is large, especially in the higher frequency region (the operating region), the magnetic permeability along the magnetic path being 3000 or more at a frequency of 10 MHz. Therefore, a higher line density and a higher frequency recording in the magnetic recording media can be dealt with readily.

An explanation will now be provided of the method for manufacturing the thin-film magnetic head 1 by reference to FIG. 1. In the production process of the thin-film magnetic head 1, several hundred elements are built collectively on one substrate by applying the photolithography technique. The substrate is then cut into pieces in a conventional manner which are then processed into individual thin-film magnetic heads 1.

First, the lower magnetic core 3 made of Co-based amorphous alloy is formed on the surface of the substrate 2 via a DC magnetron sputtering process. As a result, the magnetic anisotropy of the lower magnetic core 3 shows substantially a perpendicular direction relative to the direction which will become the magnetic path.

Next, the magnetic gap layer 4 is formed on the surface of the lower magnetic core 3. Then, by applying the photolithography technique, the coil-form electric conductive layer 7 is formed so that it winds around the prescribed region on the surface of the magnetic gap layer 4, while the lower insulation layer 5 and the upper insulation layer 6 are formed so that the coil-form electric conductive layer 7 is embedded therein. Furthermore, the upper magnetic core 8 is formed on their surface via a DC magnetron sputtering process. As a result, the magnetic anisotropy of the upper magnetic core 8 is also in a substantially perpendicular direction to the direction which will become the magnetic path.

Subsequently, the lower and upper insulation layers 5, 6 are patterned to expose the surface of the lower magnetic core 3 in the predescribed region and the surface of the magnetic gap layer 4. Then the lower magnetic core 3 made of Co-based amorphous alloy are formed thereupon. In this way, the lower magnetic core 3 and the upper magnetic core 8 are connected together at one end, while at the other end the magnetic gap-forming layer 4 is interposed between these layers. The coil-form electric conductive layer 7 winds around the connection 1a of the lower magnetic core 3 and the upper magnetic core 8. Following this process, the surface protective layer 9 is formed on the surface of the upper magnetic core 8.

In this example, the lower and upper magnetic cores 3, 8 are heated to relax their magnetic anisotropy after any process following the formation of the lower magnetic core 3 and the upper magnetic core 8, for example, after the formation of the surface protective layer 9. In other words, the lower and upper magnetic cores 3, 8 immediately after formation have a low magnetic permeability. Therefore, the lower and upper magnetic cores 3, 8 are subjected to a magnetic field under an atmosphere at an elevated temperature to relax their magnetic anisotropy and raise their magnetic permeability. Moreover, this is not the simple application of an external magnetic field under an atmosphere at an elevated temperature. Rather, the external magnetic field is applied to the lower and upper magnetic cores 3, 8 while they are in the cooling process.

Figure 2:
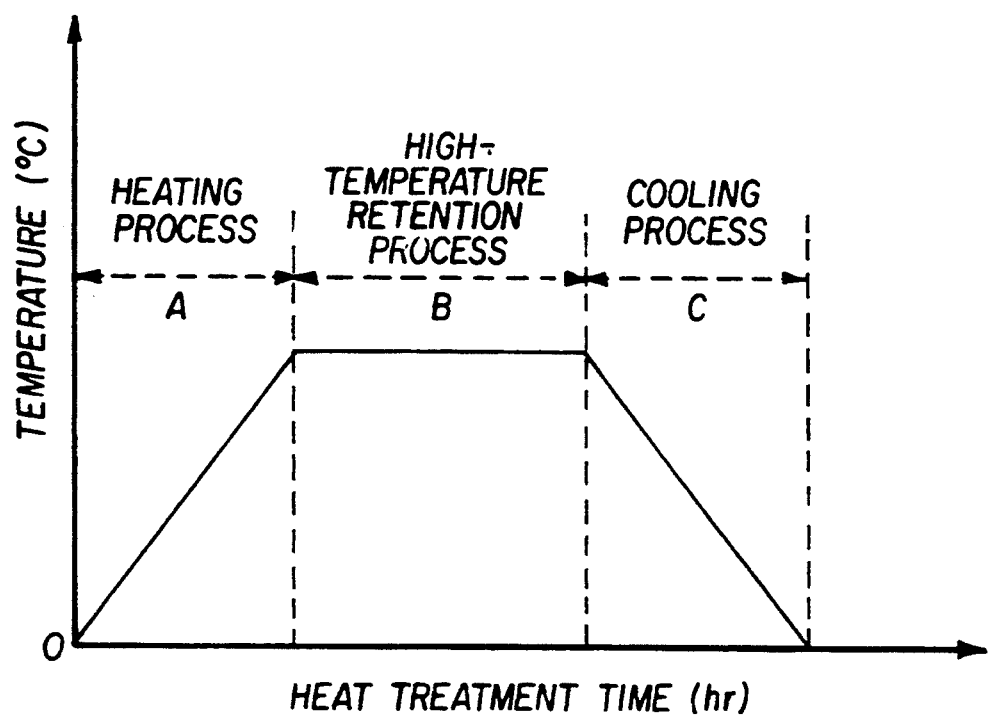
FIG. 2 is a graph showing temperature profiles during a heat-treatment process for manufacturing a thin-film magnetic head in accordance with the present invention.

During such heat treatment (magnetic anisotropy relaxing treatment), many substrates with a diameter of 3 to 4 inches are accommodated in a heating furnace, and a magnetic field is applied to the substrates externally in the heating furnace. Because the substrates are rotated at a speed of 100 rpm in the heating furnace, a rotating magnetic field is applied to the substrates. The temperature profile of the substrates is shown by the heating process (period A), the high-temperature retention process (period B), and the cooling process (period C), as shown graphically in FIG. 2, among which the magnetic field application during the cooling process (period C) is utilized, which is effective in improving the magnetic characteristics. The substrates are cooled by natural convection under a vacuum atmosphere in the heating furnace.

The effects of improving the magnetic permeability as a result of this heating treatment are explained hereunder, based on the results of inspections on the relationship of the high-temperature retention temperature during the high-temperature retention process and the magnetic permeability, the relationship of the sizes of the applied magnetic field and the magnetic permeability, the relationship between the high-temperature retention time during the high temperature retention process and the magnetic permeability, and the relationship of the temperatures when the magnetic field application is removed during the cooling process and the magnetic permeability. These results are shown in FIGS. 3 through 6. The Co-based amorphous alloys used during the production process are CoZrTa-based and CoHfTa-based alloys. The magnetic permeability referred to herewith is a magnetic permeability in the head magnetic path direction.

Figure 3:
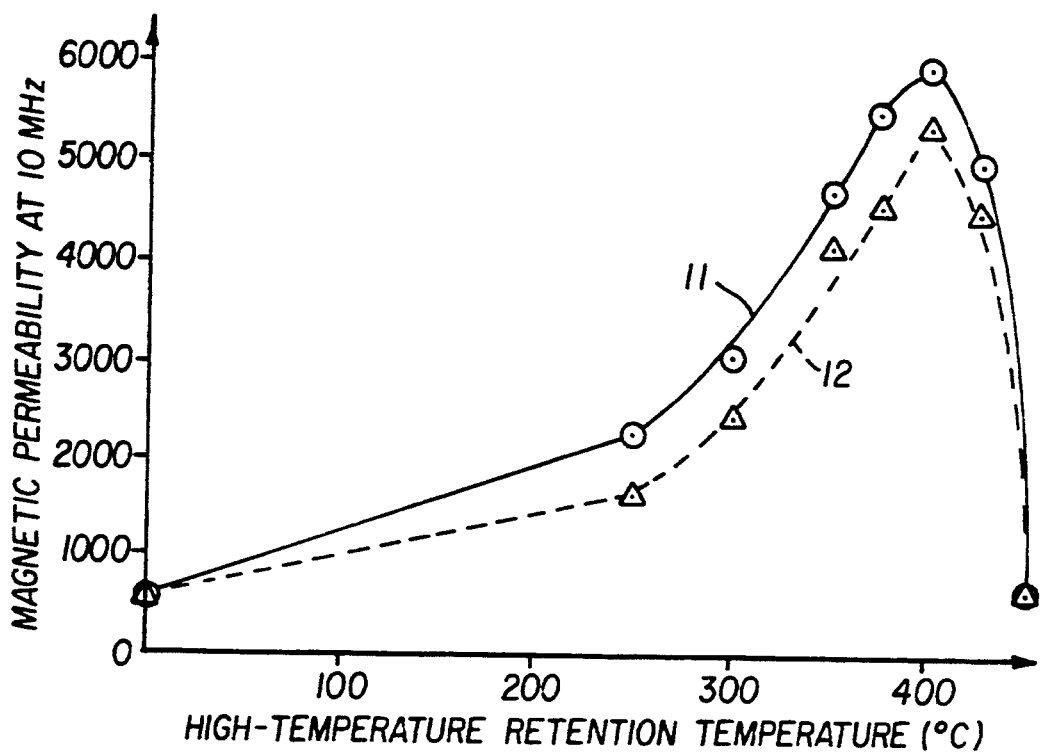
FIG. 3 is a graph showing the relationship between the high-temperature retaining temperature and the magnetic permeability during a heat treatment process in the method for manufacturing thin-film magnetic head according to the present invention.

The relationship of the high-temperature retention temperature during the high-temperature retention process and the magnetic permeability is shown in FIG. 3. A magnetic permeability ($\mu$ 10 MHz) at 10 MHz corresponding to each temperature when the retention temperature during the high-temperature retention process varies from room temperature to 450° C. While in the illustrated experiment the external magnetic field was applied at 0.6 kOe up to the final step in the cooling process, nearly the same trend was obtained either when the external application was started at the beginning of the heating process or when it was started at the beginning of the high-temperature retention process. The high temperature was retained for one hour during the high-temperature retention process.

In FIG. 3, the solid line 11 shows the result of high temperature retention in the CoZrTa-based amorphous alloy, while the broken line 12 shows that of the CoHf- Ta-based alloy. In either case, there was a tendency for a higher high-temperature retention temperature, to lead to a higher magnetic permeability. The magnetic permeability was about 3,000 at a temperature of 300° C. and about 4,000 at 325° C. As shown, the magnetic permeability shows a peak value when the high-temperature retention temperature is about 400° C., which decreases at higher temperatures. The reason for this is that all Co-based amorphous alloys crystallize at about 400° C. Therefore, the high-temperature retention temperature should preferably be set to about 300° C. or higher, or more preferably to about 325° C. or higher, but lower than the crystallizing temperature of the alloys.

Figure 4:
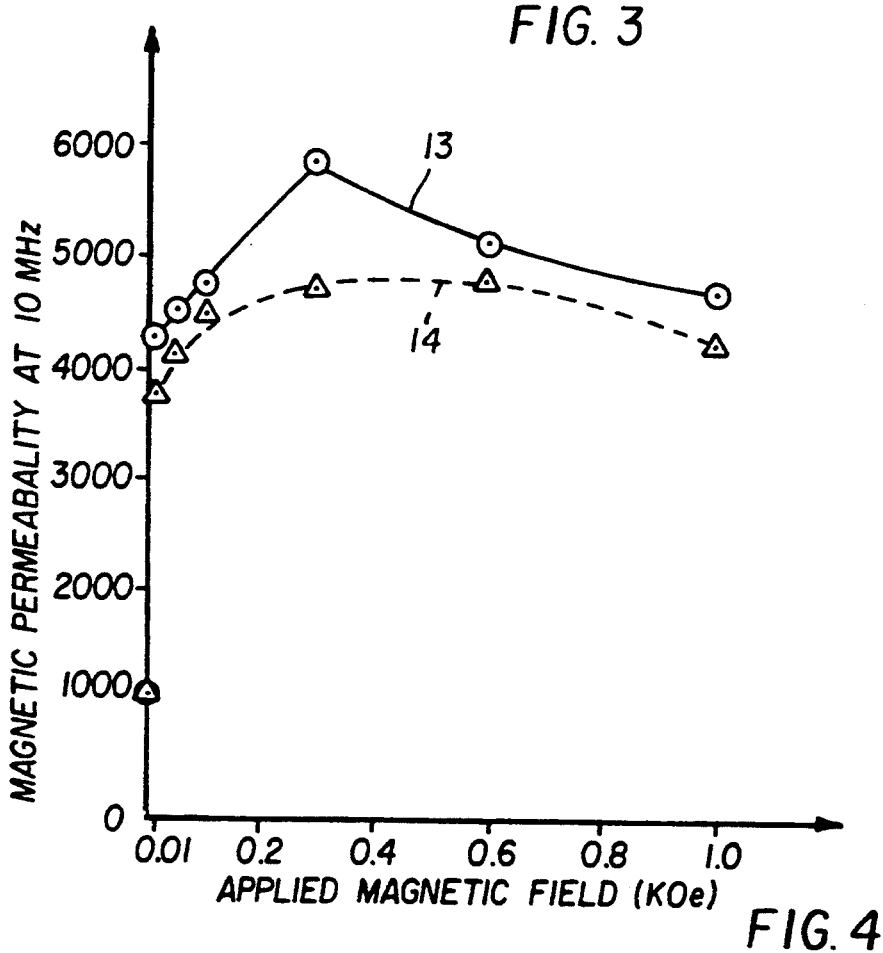
FIG. 4 is a graph showing the relationship between the strength of the applied magnetic field and the magnetic permeability during a heat treatment process in the method for manufacturing thin-film magnetic head according to the present invention.

The relationship of the sizes of the applied magnetic field and the magnetic permeability will now be discussed. The magnetic permeability at 10 MHz ($\mu$ 10 MHz) corresponding to the size of each applied magnetic field when it changes from 0 kOe to 1.0 kOe is shown in FIG. 4. Here again the external magnetic field was applied up to the final step in the cooling process, but nearly the same trend had been obtained either when the external application was started during the heating process or when it was started at the high-temperature retention process. The high-temperature retention condition consisted of the retained temperature at 375° C. and a retaining time of one hour.

In FIG. 4, with the result of the CoZrTa-based amorphous alloy as shown by the solid line 13, and the result of the CoHfTa-based amorphous alloy as shown by the broken line 14, the magnetic permeability was about 1,100 when the applied magnetic field was zero, that is when no magnetic field was applied, to either alloy. However, the magnetic permeability rose when a magnetic field was applied. As the applied magnetic field became greater, the magnetic permeability tended to rise. Nevertheless, even with an applied magnetic field of about 0.01 kOe, magnetic permeability improved remarkably.

Therefore, when the external magnetic field was applied also in the cooling process, the external magnetic field was sufficient even at about 0.01 kOe, and did not require a large magnetic field. Accordingly, when the method for manufacturing the thin-film magnetic head is used according to this embodiment, no expensive heating furnace to create a large magnetic field is required.

As the applied magnetic field increases, the magnetic permeability also tends to increase, and the same tendency can be obtained even when the applied magnetic field is set to 0.01 kOe as proved by other inspections performed according to this embodiment.

Figure 5:
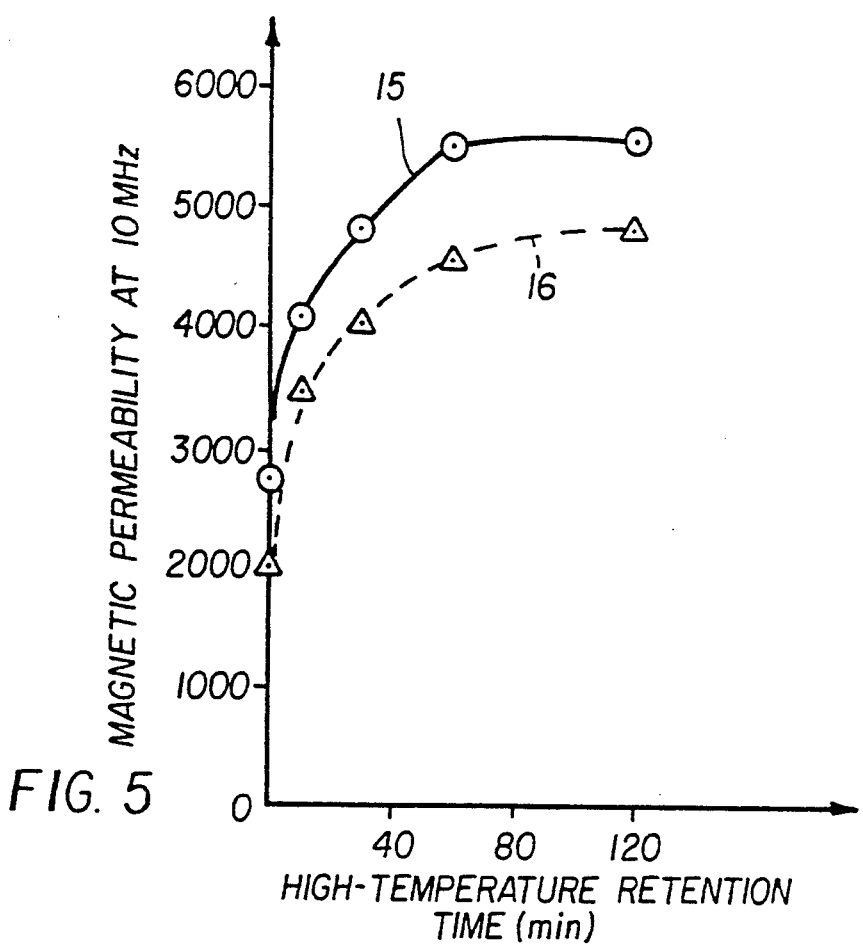
FIG. 5 is a graph showing the relationship between high-temperature retention time and magnetic permeability during heat treatment in the method for manufacturing thin-film magnetic head according to the present invention.

The relationship of the high-temperature retention time during the high-temperature retention process and the magnetic permeability will be discussed with reference to FIG. 5. The magnetic permeability at 10 MHz ($\mu$ 10 MHz) corresponding to each retention time when the high-temperature retention time during the high temperature retention process was changed from 0 to 120 minutes is shown in FIG. 5. Here the external magnetic field was set to 0.6 kOe up to the final step in the cooling process. Nevertheless nearly the same trend was observed either when the external application began during the heating process or when it began during high-temperature retention process. The high-temperature retention temperature was about 375° C.

In FIG. 5, with the results of the CoZrTa-based amorphous alloy as shown by the solid line 15, and with the results of the CoHfTa-based amorphous alloy as shown by the broken line 16, as the high-temperature retention time increased, the magnetic permeability also tended to increase in either alloy; however, the magnetic permeability became 3,000 or higher when the high temperature was retained for about ten minutes.

Therefore, when the external magnetic field is applied also during the cooling process as in this embodiment, a high magnetic permeability is obtained even when the high-temperature retention time is only ten minutes. Therefore, the throughput in this heating treatment process is greatly improved.

Moreover, as the high-temperature retention time becomes longer, the magnetic permeability increases, and the same tendency can be observed even when the high-temperature retention time is set to ten minutes, as proved in other inspections performed according to this embodiment.

The relationship of the temperatures when the magnetic field application is removed in the cooling process and the magnetic permeability will be discussed with reference to FIG. 6, which shows the magnetic permeability at 10 MHz ($\mu$ 10 MHz) corresponding to each temperature field when the temperature with the applied magnetic field remove during the cooling process changes from 50° C. to 375° C. Here again, nearly the same trend was observed either when the external application began during the heating process or when it began during the high-temperature retention process. The high-temperature retention condition consisted of a retained temperature of 375° C., a retention time of one hour, and an applied magnetic field of 0.1 kOe.

Figure 6:
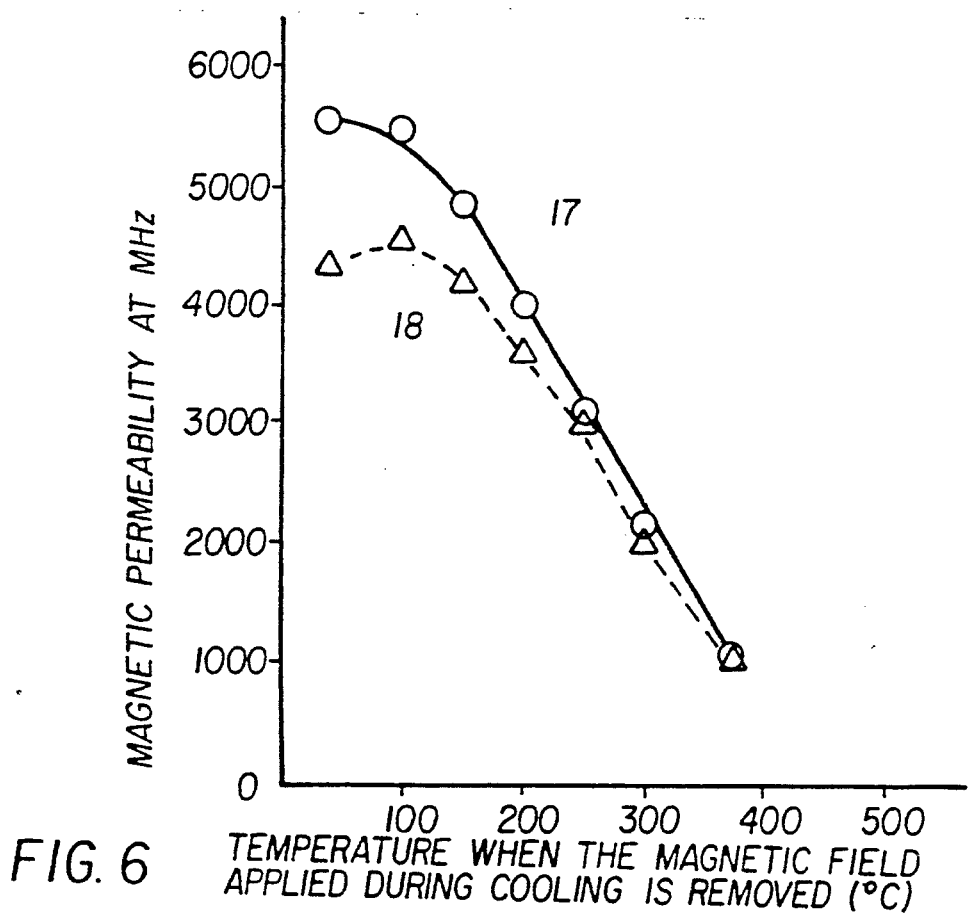
FIG. 6 is a graph showing the relationship between the temperature when the applied magnetic field is removed in a cooling process and the magnetic permeability in the method for manufacturing thin-film magnetic head according to the present invention.

In FIG. 6, the results of the CoZrTa-based amorphous alloy are shown by the solid line 17, and the results of the CoHfTa-based amorphous alloy are shown by the broken line 18. As the temperature when the external magnetic field is removed drops, that is, as the external magnetic field is removed during cooling, the magnetic permeability increases. For example, if the external magnetic field is removed under a temperature of 250° C., magnetic permeability will equal about 3,000, while if the external magnetic field is removed when the temperature is 100° C., magnetic permeability will equal 4,000 or higher. Since the test pieces are cooled in a vacuum, the cooling rate is low. However, even if the cooling rate were increased by introducing nitrogen gas, no large Change would be observed in the relationship of the temperature, when the above-mentioned applied magnetic field is removed, and the magnetic permeability. Furthermore, it was verified that the governing factor is the temperature.

While magnetic permeability tends to increase if the external magnetic field is applied up to the final step of the cooling process, the same tendency could be observed even if the temperature when the applied magnetic field is removed were set to 250° C. or lower, and the magnetic field application were discontinued halfway through the cooling process. This conclusion was substantiated by other inspections performed according to this embodiment.

As described above, according to the method for manufacturing the thin-film magnetic head of this embodiment, Co-based amorphous alloy having a higher saturated magnetic flux density than the permalloy NiFe alloys, such as CoZrTa alloy, CoHfTa alloy or CoHfTa alloy, is used so that a high magnetic permeability $\mu$ can be obtained by relaxing its strong uniaxial anisotropy. Moreover, using such alloys makes it possible to cope with the coercive force of the magnetic recording media, thus a higher recording density in the magnetic recording media can be dealt with.

Furthermore, according to this embodiment, since the magnetic anisotropy can be relaxed sufficiently by an applied magnetic field of even 0.01 kOe, expensive heating furnaces equipped with a large magnetic field generator are not required as in the past. Thus substrates comprising a large number of elements can be produced cheaply using inexpensive equipment.

While this embodiment uses a rotating magnetic field as the external magnetic field, the same effect can be achieved even when a static magnetic field whose direction is the same with that of the magnetic head is used as long as a magnetic field is applied during the cooling process.

As described, the present invention is characterized by heating lower and upper magnetic cores made of a Co-based amorphous alloy formed on a substrate, and by applying heat treatment (anisotropy relaxing treatment) in which an external magnetic field including a rotating magnetic field of 0.01 kOe or higher is applied to relax the magnetic anisotropy of the lower and upper magnetic cores during at least their cooling process. Therefore, according to the present invention, because of its large effect of relaxing the magnetic anisotropy, the lower and upper magnetic cores have a saturated magnetic flux density as high as from 10,000 G to 18,000 G. Furthermore, since the magnetic permeability in the magnetic path direction of a magnetic head is as high as 3,000 at a frequency of 10 MHz, the invention can be used to realize a thin-film magnetic head for higher density recording on magnetic recording media.

Also, because the external magnetic field in the heat treatment process is higher than 0.01 kOe, and the above effect can be realized using a small magnetic field, magnetic anisotropy relaxation treatment can be performed using a small and inexpensive magnetic field generator even when a large heating furnace capable of processing a large number of substrates is used, thus reducing the cost required to produce thin-film magnetic heads.

The invention has been described with reference to certain preferred embodiment thereof. It will be understood, however, that modifications and variations are possible with the spirit and scope of the appended claims.

What is claimed is:

1. A method for manufacturing a thin-film magnetic head comprising the steps of:
    forming a lower magnetic core made of cobalt based amorphous alloy on a surface of a substrate;
    forming a magnetic gap layer on the lower magnetic core;
    forming a coil-form electric conductive layer on the magnetic gap layer;
    forming an upper magnetic core made of cobalt based amorphous alloy over the coil-form electric conductive layer, wherein the upper magnetic core is connected to the lower magnetic core at first ends thereof through a central region of the coil-form electric conductive layer and the upper magnetic core is spaced from the lower magnetic core by the magnetic gap layer at second ends thereof; and
    heat treating the substrate having the lower magnetic core, the magnetic gap layer, the coil-form electric conductive layer and the upper magnetic core formed thereon with a heat treatment process comprising:
    heating said substrate up to a retention temperature higher than 325° C. but lower than a crystallizing temperature of the cobalt based amorphous alloy;
    retaining the heated substrate at the retention temperature for more than ten minutes while applying an external rotating magnetic field greater than 0.01 kOe to the lower and upper magnetic cores formed on the substrate; and
    cooling the substrate down to a temperature below 250° C. while applying the external rotating magnetic field to the lower and upper magnetic cores formed on the substrate.

2. A method for manufacturing a thin-film magnetic head as claimed in claim 1, wherein:
    a plurality of the thin-film magnetic heads comprising the lower magnetic core, the magnetic layer, the magnetic gap layer, the coil-form electric conductive layer and the upper magnetic core are formed on a surface of a substrate through the steps of forming the lower magnetic core, the magnetic layer, the magnetic gap layer, the coil-form electric conductive layer and the upper magnetic core; and
    the plurality of the thin-film magnetic heads are heat treated together while applying the external rotating magnetic field in the heat treatment process.

3. A method for manufacturing a thin-film magnetic head as claimed in claim 2, wherein a plurality of the substrates are heat treated together while applying the external rotating magnetic field in the heat treatment process.

4. A method for manufacturing a thin-film magnetic head comprising the steps of:
    forming a plurality of thin-film magnetic heads on a surface of a substrate, wherein the thin-film magnetic head comprises a lower and an upper magnetic cores made of cobalt based amorphous alloy, connected together at a first ends thereof and spaced with a magnetic gap at a second ends thereof; and
    heat treating the substrate having the plurality of thin-film magnetic heads formed thereon with a heat treatment process comprising:
    heating said substrate up to a retention temperature higher than 325° C. but lower than a crystallizing temperature of the cobalt based amorphous alloy;
    retaining the heated substrate at the retention temperature for more than ten minutes while applying an external rotating magnetic field greater than 0.01 kOe to the lower and upper magnetic cores formed on the substrate; and
    cooling the substrate down to a temperature below 250° C. while applying the external rotating magnetic field to the lower and upper magnetic cores formed on the substrate.

5. A method for manufacturing a thin-film magnetic head as claimed in claim 4, wherein a plurality of the substrates are heat treated together while applying the external rotating magnetic field in the heat treatment process.

* * * * *